United States Patent [19]

Sedman

[11] Patent Number: 4,826,594
[45] Date of Patent: May 2, 1989

[54] PORTABLE WATER CONDITIONING APPARATUS

[75] Inventor: Raymond R. Sedman, Reseda, Calif.

[73] Assignee: United Environmental Technologies, Paoli, Pa.

[21] Appl. No.: 149,490

[22] Filed: Jan. 28, 1988

[51] Int. Cl.[4] .............................................. B01D 27/02
[52] U.S. Cl. .................................... 210/266; 210/282; 210/283; 210/287; 210/290
[58] Field of Search ............... 210/282, 266, 283, 284, 210/287, 290

[56] References Cited

U.S. PATENT DOCUMENTS

| | | |
|---|---|---|
| 3,342,340 | 9/1967 | Shindell ............................. 210/282 |
| 4,151,092 | 4/1979 | Grimm et al. .................. 210/282 X |
| 4,212,743 | 7/1980 | Van Meter et al. ................. 210/282 |
| 4,368,123 | 1/1983 | Stanley ........................... 210/282 X |
| 4,578,187 | 3/1986 | Alhauser ......................... 210/282 X |
| 4,681,677 | 7/1987 | Kuh et al. ....................... 210/282 X |
| 4,686,037 | 8/1987 | Lang ............................... 210/282 X |

Primary Examiner—Charles Hart

[57] ABSTRACT

A portable water container for home use wherein a replaceable container for the conditioning media is provided with a locking base and a surrounding envelope. A top cap is provided to maintain the container and the output conduit therefrom in a fixed position within the envelope during operation. The removal of the top cap and envelope enable the container to be readily detached from the base and a new container installed.

17 Claims, 3 Drawing Sheets

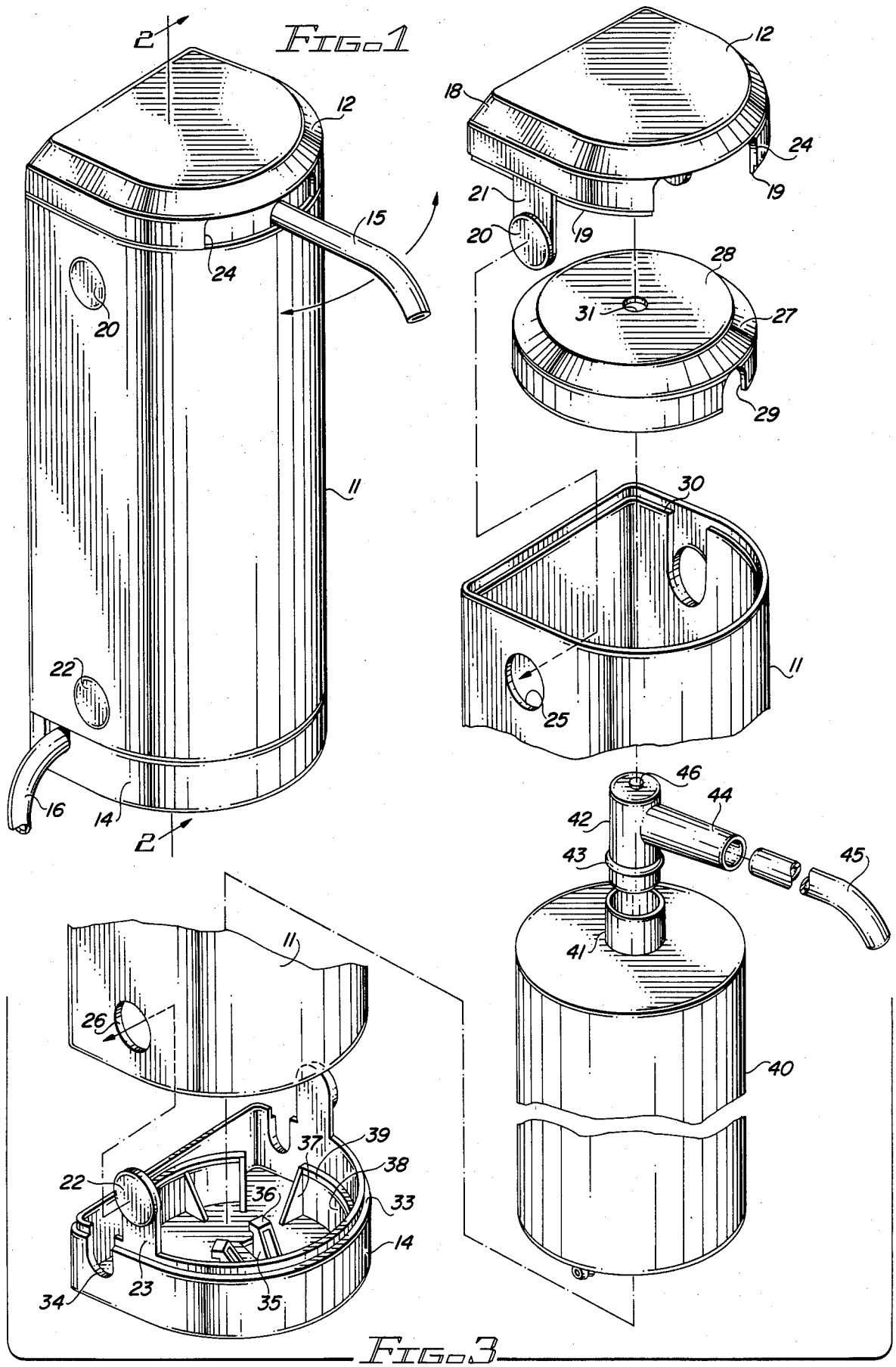

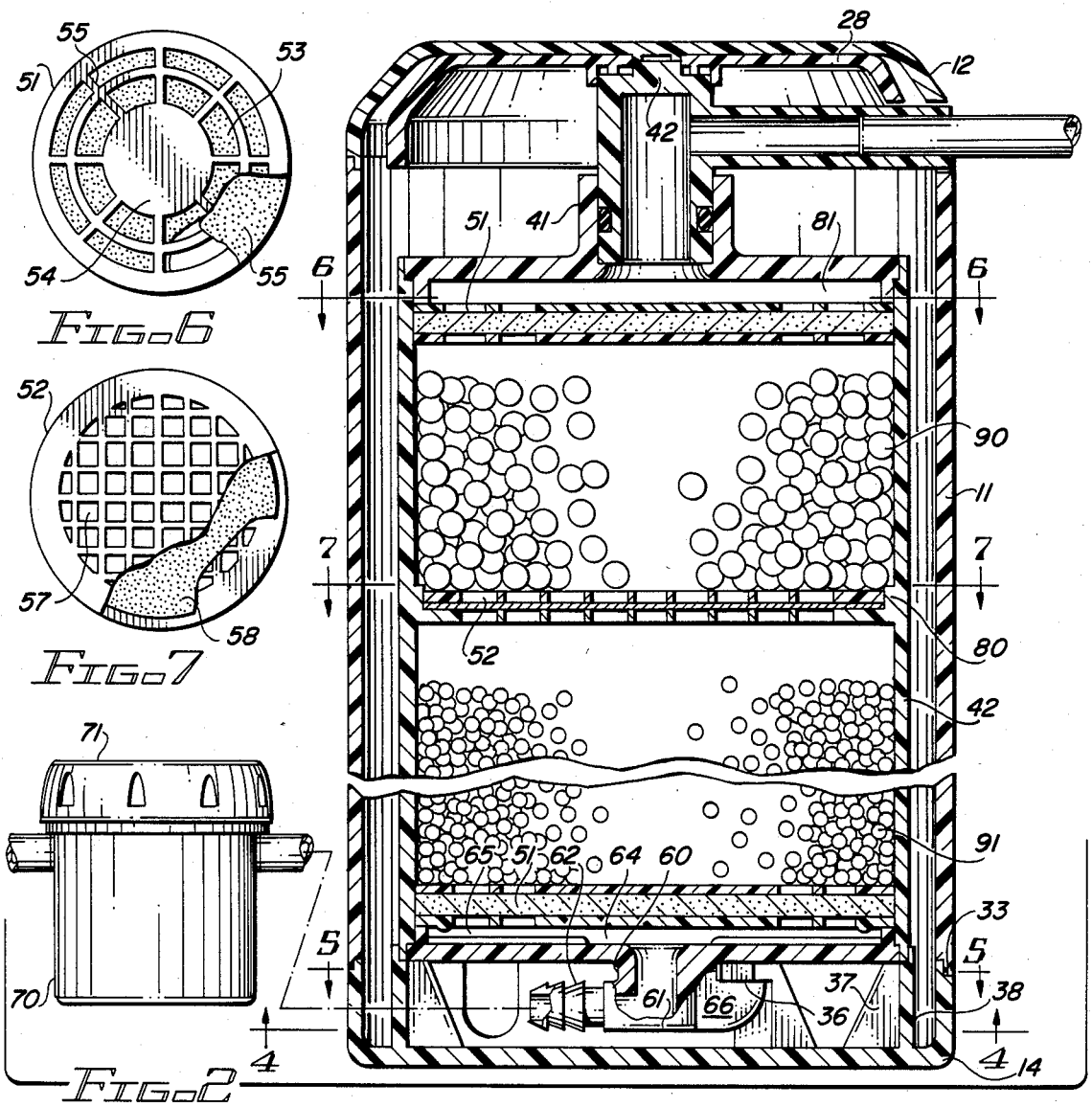
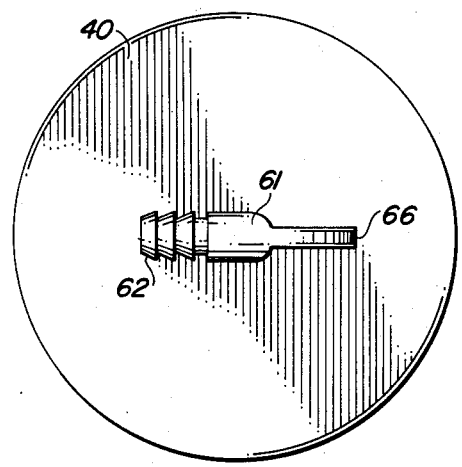
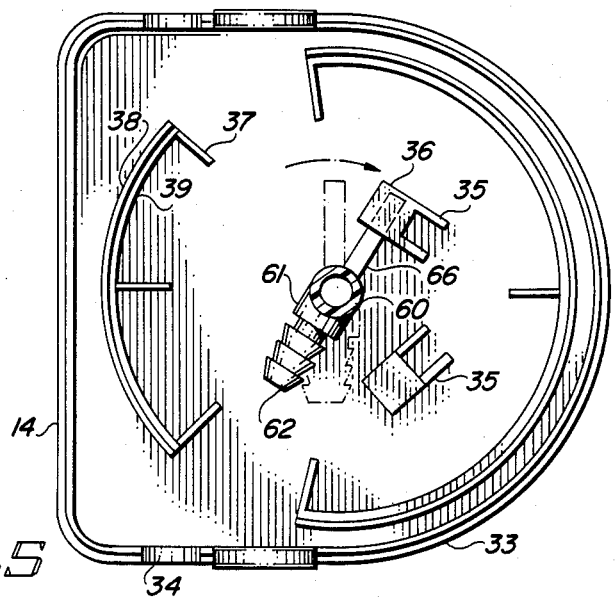

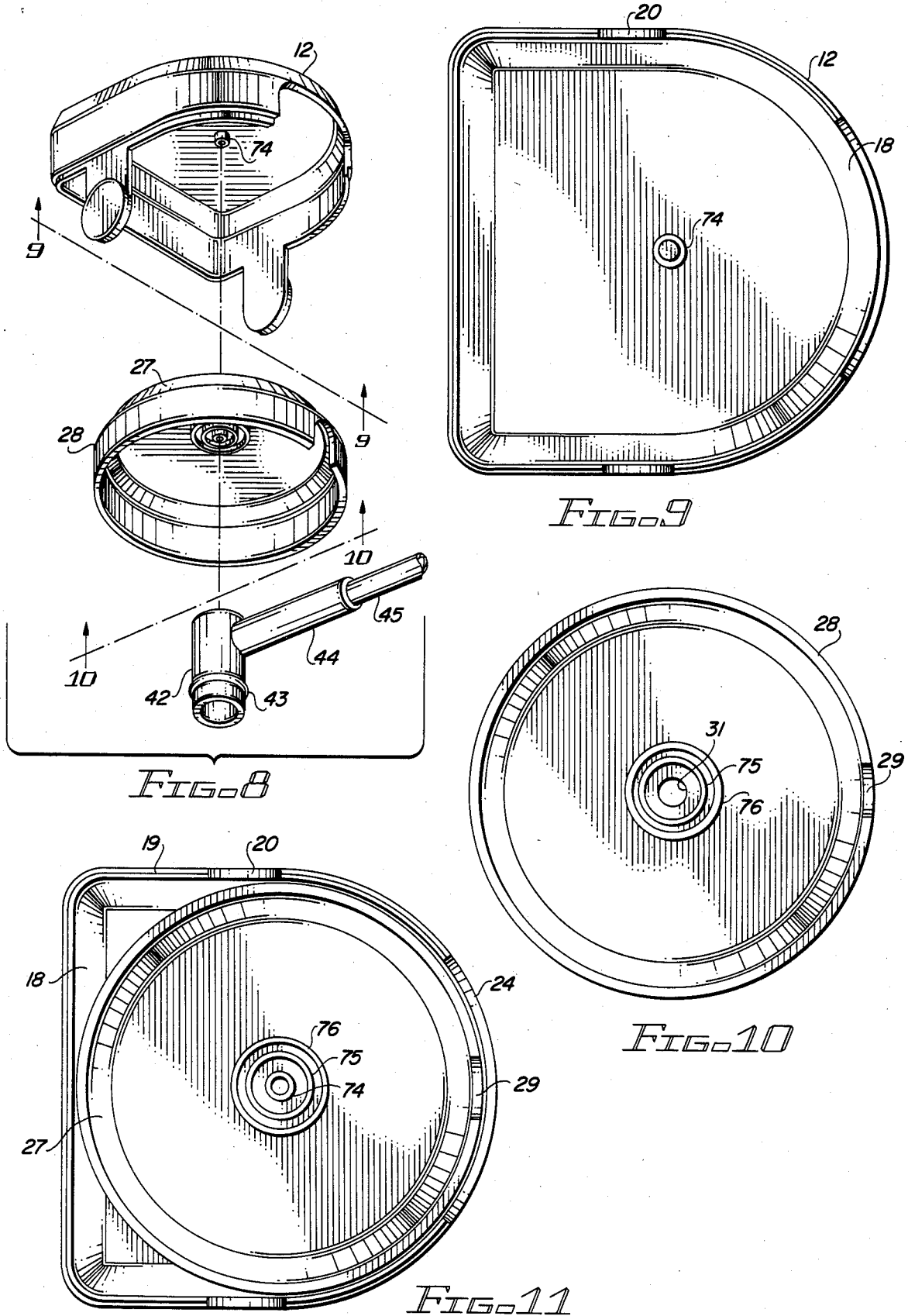

4,826,594

PORTABLE WATER CONDITIONING APPARATUS

BACKGROUND OF THE DISCLOSURE

This invention relates to a portable water conditioner and, in particular, a water conditioner wherein the container for the conditioning media can be readily removed from its housing and replaced with a fresh cartridge for continued operation.

Recently publicized studies directed to the quality of the residential water supply of various municipalities throughout this country have pointed out the presence of a variety of different contaminants at unacceptable levels in municipal water supplies. These studies and the resulting publicity has generated increasing interest in small portable water conditioning apparatus of the type adapted for home use. A number of products have heretofore been successfully marketed for this purpose and primarily include one or more cylindrical structures which are placed adjacent a single water source in the home. Typically, the apparatus is placed on the kitchen counter top so that it is readily accessible for family use.

The devices have utilized both a replacement of spent media-containing cartridges and a separate recharging apparatus to cause a flow of brine through the container in a reverse direction for continued operation. The different ion exchange resins and bacterial-reducing agents utilized in the various home conditioning units require different regeneration or replacement cycles based on the contaminant levels at the different locales.

The presently available units have been characterized by being unwieldy, generally unattractive and typically occupy a relatively large area of what is normally the work area of the busiest room in the house, the kitchen. Furthermore, the disassembly and replacement of the operative media has often been complicated and a distinct disadvantage in the acceptance for continued use of the portable water conditioning apparatus in the home.

Accordingly, it is a primary objective of the present invention to provide a portable water conditioner which is of improved design so as to permit the user to readily replace the media-containing cartridge. In addition, the present invention is directed to the provision of a portable conditioning apparatus which occupies a relatively small area for its situs and is provided with a uniform exterior so as to be aesthetically pleasing in the home environment. Furthermore, the present apparatus combines the different media in a single container. The container is maintained in an upright position during usage and is provided with a movable spout to enable the user to vary the direction of the output therefrom.

SUMMARY OF THE INVENTION

The present invention is directed to a portable water conditioning apparatus especially adapted for home usage wherein a single container is provided for receiving the water conditioning media therein. The container has first and second ends with corresponding ports located in the respective ends for the passage of fluid through the media within the container.

The second end of the container is provided with a locking means affixed thereto. A base cap having an outer surface for placement on a support surface is provided with engaging means for receiving the locking means and removably securing the container to the base cap. A surround means forming a major portion of the enclosure for the container is attached to the base cap. First and second apertures are located in the enclosure and positioned proximate to the respective ports located in the ends of the container to facilitate connection to external conduit means. The base cap includes a guide means which receives the second end of the container to position it in an upright position. A first release means is included to enable the user to readily separate the surround means from the base cap and thereby effect replacement of the container when the media is exhausted. The frequency of replacement is determined by the type of media included in the container and the condition of the local water supply.

In one embodiment of the invention, the surround means has first and second open ends with the aforementioned base cap attached to the second end. A top cap is removably attached to the first end and is provided with second release means for facilitating separation of the surround means from the top cap. As a result the user has access to both ends of the container and can readily separate the enclosure into three distinct parts: top cap, surround means and base cap. During the separation, the base cap remains affixed to the container keeping it in an upright position. After the disassembly, the user releases the locking means affixed to the container from the engaging means of the base cap and removes the external water supply connection from the base to replace the container with a fresh one. However, the container can be subjected to reverse flow regeneration using brine or other fluids depending on the media employed in the container without the user separating the enclosure into its individual parts.

Further features and advantages of the invention will become more readily apparent from the following detailed description of a specific embodiment of the invention when taken in conjunction with the accompanying drawings.

BRIEF DESCRIPTION OF THE DRAWINGS

FIG. 1 is a view in perspective of a preferred embodiment of the invention.

FIG. 2 is a side view in section of the embodiment of FIG. 1 including a regeneration cup.

FIG. 3 is an exploded view showing the constructional features of the embodiment of FIG. 1.

FIG. 4 is a view taken along line 4—4 of FIG. 2.

FIG. 5 is a view taken along line 5—5 of FIG. 2.

FIG. 6 is a view taken along line 6—6 of FIG. 2.

FIG. 7 is a view taken along line 7—7 of FIG. 2.

FIG. 8 is an exploded view showing the top cap and spacer of the embodiment of FIG. 1.

FIG. 9 is a plan view of the underside of the top cap of FIG. 8.

FIG. 10 is a plan view of the underside of the spacer of FIG. 8.

FIG. 11 is a plan view of the underside of the top cap of FIG. 9 with the spacer of FIG. 10 positioned there against.

DESCRIPTION OF THE PREFERRED EMBODIMENT

Referring now to FIG. 1, the present invention is directed to portable water conditioning apparatus having the preferred configuration shown wherein the apparatus includes a base cap 14, a surround means 11 and a top cap 12. The configuration is generally cylindrical in shape with a flattened portion extending axially throughout its length. In operation, the structure is in the position shown in FIG. 1 with the fluid conduit means 16 coupled to an external water supply activated by a conventional valve nor shown. When the valve is opened, the water enters the apparatus through the opening in the base cap 14 and travels upwardly to be emitted by the output spout 15. The spout 15 is movable in the direction of the arrows shown to facilitate filling other containers and for general usage. The top cap 12 has a slotted opening 24 which limits the horizontal movement of the spout.

The base cap 14 and top cap 12 can be readily removed from the surround means 11 by depressing circular inserts 22 and 20 to permit separation of the three parts comprising the envelope of the apparatus. When separated, access is provided to a central container 40 noted in FIG. 3 which contains the conditioning media. The conditioning media is determined in part by the characteristics of the local water supply and may be varied based on the impurity levels of different substances. In this discussion of a preferred embodiment, the container 40 is provided with a region containing a mixed bed of anion and cation bead resins which perform the conventional ion exchanges to remove metallic ions such as calcium and magnesium as well as removing inorganic ions. In addition, a bed of silver activated charcoal is provided to effect an antibacterial treatment for the water passing therethrough.

The exploded view of FIG. 3 shows the structural relationship of the container 40 and the spaced adjacent surround 11 in alignment therewith in accordance with the dashed line. It is to be noted that the central sections of the container and surround are omitted. The upper end of inner container 40 is provided with a cylindrical output port 41 which receives a portion of the fluid output diverter 42 therein. A sealing ring 43 is contained in a groove in the diverter 42 to provide a rotatable sealing engagement between the output port and the diverter. A fluid connecting arm 44 extends laterally from the diverter 42 and receives an output spout 45 therein.

On the top surface of the output diverter 42, an alignment protrusion 46 is shown extending upwardly. The overlying positioning disc 28 has a centrally-located aperture 31 therein for receiving the protrusion 46. Also, disc 28 has a semicircular opening 29 which receives the fluid connecting arm 44 and is provided with a beveled edge 27 extending circumferentially thereabout. As will be explained in later detail, the top cap 12 engages the positioning disc 28 to mainrain the axial alignment of the output diverter 42 during normal operation. The top cap has a beveled edge 18 which accomodates the beveled edge 27 of positioning disc 28 when the unit is assembled.

When the surround 11 is in position outside the container 40, the output diverter 42 is placed in the cylindrical output port and the positioning disc 28 placed thereon with opening 29 in overlying position for connecting arm 44. Then, the circular inserts 20 extending downwardly from the flexible tabs 21 at the sides of the top cap are displaced to enable them to fit readily within the surround and the top cap is urged downwardly so that the circular inserts engage and are firmly seated in apertures 25. The release of pressure from the circular inserts 20 causes them to move outwardly to the original position so that a secure attachment of parts is effected.

The base cap 14 firmly attaches to the bottom end of the container 40 to provide the structural rigidity for the container within the enclosure. As noted in FIG. 3, the bottom cap 14 has the same configuration as the surround 11 and includes an outer ridge 33 for receiving the peripheral portion of the bottom edge of the surround. In addition, circular inserts 22 are coupled by flexible tabs 23 to the bottom of the base cap. The urging of the inserts inwardly followed by the insertion therein into the surround 11 causes the inserts to be received in the opposing lower apertures 26. The release of pressure from the circular inserts results in a secure attachment of the surround to the base. The base is provided with a circular container support guide 38 maintained in an upright position by triangular braces 37 spaced thereabout. The support guide includes an inner positioning ridge 39 which receives the outer edge of the container when it is positioned thereon. The support guide 38 is not continuous to permit access to the bottom of the container 40 through the opposing apertures 34 so as to permit connection by fluid conduit means to an external water source.

The affixation of the container 40 to the base cap 14 is accomplished by a placement of the container on the supporting guide 38 and a rotation thereof so that locking means affixed to the bottom of the container contact a stop 35 formed on the inner surface of the base cap and having a flange 36 extending outwardly to engage the locking means. A plan view of the bottom of the container 40 is shown in FIG. 4 wherein a fluid input diverter 61 is centrally located. An external connector 62 is formed on one side of the diverter 61 and diametrically opposed thereto is a tab 66 for removably engaging the flange 36 of the base cap. The engaging operation is shown in further detail in FIG. 5 wherein the container 40 is omitted with the exception of the input port 60 at the bottom thereof. The diverter 61 is shown with the tab 66 in place beneath flange 36 of stop 35. This result is obtained from a placement of the container upon the base cap in the initial position shown by the dotted outline followed by rotation in the direction of the arrow shown until the stop is encountered and the locking tab 66 frictionally engages the flange 36. When so positioned, the external connector 62 is directed generally toward the corresponding aperture 34 formed in the base cap. In the embodiment shown, the aperture is formed to open upwardly from the edge of the base cap so that the external connector 62 can be coupled to fluid conduit means prior to a positioning of the container 40 upon the support guide 38 and positioning ridge 39. Since the fluid conduit means is typically flexible and runs back to the faucet being utilized as a water source, the apertures can be formed in the bottom edge of the surround 11 as well as being positioned at the edge of the base cap 14. In the affixed position shown in FIG. 5, the peripheral portion of the container 40 is aligned and supported by guide 38 and ridge 39. The locking of the tab 66 underneath the flange 36 insures that the fluid conduit means is directed toward the appropriate aperture to permit a substantially straight flowpath to the water source.

The constructional features of the alignment means provided by the top cap 12, spacer 28 and output diverter 42 are shown in further detail in FIGS. 8 through 11 wherein the top cap 12 is shown provided with a downward protruding ring 74 on the underside thereof. The positioning disc 28 contains a central aperture 31 which receives the ring 74 therein. In the preferred embodiment, the vertical dimension or height of the ring 74 is made such that it does not extend through the positioning disc when the disc is placed there against. The beveled side 27 of disc 28 is received by the beveled edge 18 of top cap 12 formed in the circular region of the top cap and at the straight back portion thereof. Thus, the top cap and positioning disc are aligned and supported over a major portion of their peripheral regions with the disc 28 being capable of rotation when so positioned.

The fluid output diverter 42 is received within the outer circular guide 76 of positioning disc 28. An inner circular guide 75 is provided to maintain the proper spacing between the upper end of diverter 42 and the positioning disc 28. Consequently, the height of guide 75 is made less than the height of guide 76 and, in the embodiment shown, is approximately one-half the height of the outer circular guide. Guide 75 limits the movement of the alignment protrusion 46 contained on the top of diverter 42 in the axial direction. As a result, when the top of the diverter 42 is placed against guide 75, the protrusion 46 extends partly into the central aperture 31 of positioning disc 28. This results in the alignment of the diverter being maintained when the apparatus is assembled. It is to be noted that the downward protruding ring 74 of top cap 12 also extends partway into the central aperture 31. When so assembled, the opening 29 of disc 28 is aligned generally with the slotted opening 24 thereby permitting the fluid collecting arm 44 to extend outwardly. When the arm 44 and spout 45 are moved from side to side, the positioning disc 28 rotates along with the diverter 42 with the top cap remaining in place. The sealing ring 43 located on the lower portion of the diverter 42 maintains the sealing engagement between the output port of the inner container and the diverter during movement between different positions.

The cross-sectional view of FIG. 2 shows the present invention in its assembled state with inner container 40 locked to the base cap 14 and the enclosure provided by the base cap 14, surround means 11 and top cap 12 shown as a complete unit. The inner container 40 includes top and bottom ports 41 and 60, respectively. Input port 60 communicates with the external connector 62 which is coupled to fluid conduit means, not shown, through one of the apertures in the base cap to the external water supply. The inner surface of the bottom of the container 40 is provided with radial ribs 64 extending outwardly from the input port 60 and an overlying filter assembly 51 is spaced therefrom to form an input chamber 64. The plan view of the lower filter 51 is shown in FIG. 6.

A mixed resin bed 91 overlies and is supported by the lower filter 51 and comprises conventional anion and cation resin beads. These beads effect an ion exchange with the incoming water to remove metal ions and both inorganic and organic ions in accordance with their composition. The operation of resin ion exchange members is well known and the particular resins employed may vary from region to region based on the composition of the water entering the container 40. An intermediate filter 52 is shown above the resin bed 91 bonded to and abutting the peripheral support ridge 80 formed on the interior wall of container 40. The filter 52 supports a bed of activated charcoal 90 which serves as a bacterial-eliminating agent for the water passing therethrough. Overlying the bed of activated charcoal is an upper filter 51 which corresponds to the construction of the lower filter spaced adjacent input port 60. An upper chamber 81 leads to the cylindrical output port 41.

The upper and lower filters 51 are shown in the partial plan view of FIG. 6 as comprising a pair of rigid circular members each having arcuate slots 53 separated by radial arms 55 extending outwardly from a central disc 54. Intermediate the two rigid elements is a filter member shown in FIG. 2 as equaling in thickness the combined thickness of the two rigid members. The filter element removes particulate matter entering container 40 from the water source and serves to retain within the container any portion of the activated charcoal or resin media being urged by the water pressure to exit the apparatus. The upper and lower filters are formed of the same plastic material as the container and are bonded to the inner wall thereof. It should be noted that the central region of each filter element is solid to reduce the impact of water entering the input port and, in the case of a reverse flush, entering the output port 41 as well, and thus reduce channeling of the adjacent media. The arcuate configuration of the slots has been found to promote a more uniform flow through the compartments of the container 40. The filter 52 shown in FIG. 7 comprises two disc members with one having a slightly larger diameter so that the adjacent pair will firmly engage the interior wall of the container and the peripheral support ridge 80 as shown in FIG. 2. The central filter has rectangular openings 57 in each of its outer members and includes a woven or mesh filter element therebetween. This relatively coarse mesh element prevents the intermixing of the mixed resin beads from the activated charcoal during operation.

During normal operation, the external water supply is coupled to input port 60 and enters chamber 64 traversing the lower filter 51, passes through the mixed resin bed 91, second filter 52, the activated charcoal bed 90 and the upper filter 51 before exiting through the fluid output diverter 42. The flow is controlled by the external water supply which is normally a kitchen faucet. The device remains upright in the attitude shown in FIG. 2 with the user being able to direct the spout by moving it horizontally to a desired position. After a period of time, the resin bed requires recharging. Accordingly, a regeneration cup 70 having a screw cap 71 is provided to be inserted into the external water supply circuit. This regeneration of cation and anion resins is conventionally effected by flushing them with a solution of sodium or potassium chloride. The salt is placed within the regeneration cup and the water supply opened so that the regenerating compound is interspersed throughout the mixed resin bed 91. Then, the water flow is stopped and the container allowed to sit for twenty minutes or so. Next, the regeneration cup is removed from the fluid circuit and water is flushed through the assembly until the sodium or potassium chloride has been removed. This can be determined by a taste test. While the cation and anion resins are regenerated in this manner, it is to be noted that after a period of time, the activated charcoal bed will be spent and its effectiveness greatly diminished. At that time, the user then must replace container 40 by opening the enclosure.

In order to replace the container, the top cap 12 is removed by putting pressure on the circular inserts 20 and lifting vertically. The positioning disc 28 is taken off the top of the fluid output diverter 42 and it then is removed. Also, pressure is applied to the circular inserts 22 coupled to the bottom or base cap 14 to permit the surround 11 to be removed. Following that step, the user grasps the container 40 and the base cap and imparts relative rotation thereto to free the tab 66 from beneath the flange 36 of the base cap assembly. The external conduit attached to the connector 62 is removed and container 40 containing the spent media is discarded and replaced with an identical fresh unit.

While the above description has referred to a specific embodiment of the invention, it is to be noted that many modifications and variations may be made therein without departing from the scope of the invention as claimed.

I claim:

1. A portable water conditioning apparatus which comprises:
   (a) a container for receiving water conditioning media therein, said container having first and second opposing ends;
   (b) first and second ports located in said respective opposing ends for the passage of fluid therethrough;
   (c) locking means affixed to the second end of said container;
   (d) a base cap having inner and outer surfaces, said outer surface engaging a support surface;
   (e) guide means located on the inner surface of said base cap for receiving the second end of the container therein;
   (f) engaging means located on the inner surface of said base cap for receiving said locking means and removably securing said container means to the base cap;
   (g) surround means for attachment to said base cap and forming an enclosure for said container means;
   (h) first release means affixed to the surround means for enabling separation thereof from the base cap; and
   (i) first and second apertures located in the enclosure proximate to said respective ports for providing connection to fluid conduit means.

2. The invention in accordance with claim 1 wherein said surround means has first and second open ends, said second end attached to said base cap; and further comprising a top cap for removably attaching to the first end of said surround means.

3. The invention in accordance with claim 2 further comprising second release means for facilitating separation of the surround means from the top cap.

4. The invention in accordance with claim 3 further comprising fluid output means movably positioned in the first port of the container means and extending outwardly from said enclosure.

5. The invention in accordance with claim 4 wherein said second aperture comprises a slot to permit the fluid output means to be moved therein.

6. The invention in accordance with claim 5 wherein said second aperture is provided in the top cap.

7. The invention in accordance with claim 6 wherein said container means is cylindrical and the guide means of said base cap rotationally receives the container therein.

8. The invention in accordance with claim 7 further comprising a tubular extension affixed to said second port and wherein the locking means affixed to the second end of said container comprises a tab extending outwardly from the tubular extension, the rotation of the container causing the tab to be received in said engaging means.

9. The invention in accordance with claim 8 wherein said engaging means comprises at least one flanged stop member affixed to said base cap whereby said flange engages the tab when positioned against the stop member.

10. The invention in accordance with claim 9 wherein a portion of said tubular extension is diametrically opposed to the tab extending therefrom, said second port being centrally located in said container.

11. The invention in accordance with claim 10 wherein said first port includes a cylindrical portion extending upwardly from the container, said fluid output means including an inner segment being movably situated in said first cylindrical portion and an output segment extending outwardly of said top cap.

12. The invention in accordance with claim 11 further comprising spacer means for maintaining the inner segment of said fluid output means in the cylindrical portion of said first port, said means being located between the top cap and the inner segment of said output means.

13. The invention in accordance with claim 12 wherein said spacer means has upper and lower surfaces with said lower surface containing positioning means for receiving the inner segment of said fluid output means.

14. The invention in accordance with claim 13 wherein said positioning means includes a raised portion for contacting the inner segment and maintaining a separation therebetween.

15. The invention in accordance with claim 14 wherein said top cap contains a centrally-located protrusion which extends downwardly and said spacer means contains an aperture for receiving said protrusion.

16. The invention in accordance with claim 15 wherein the inner segment of the fluid output means contains a centrally-located protrusion which extends upwardly into said aperture to maintain the position of said fluid conduit means during operation.

17. The invention in accordance with claim 16 wherein said container means includes screen means for maintaining the conditioning media therein during operation.

* * * * *